US012730117B2

(12) United States Patent
de Castro et al.

(10) Patent No.: US 12,730,117 B2
(45) Date of Patent: Sep. 8, 2026

(54) SAMPLE PREPARATION

(71) Applicant: Beckman Coulter, Inc., Brea, CA (US)

(72) Inventors: Juan Fernandez de Castro, Miami, FL (US); Brahim Sahdala, Miami, FL (US); Rajani Ravilisetty, Miami, FL (US)

(73) Assignee: Beckman Coulter, Inc., Brea, CA (US)

( * ) Notice: Subject to any disclaimer, the term of this patent is extended or adjusted under 35 U.S.C. 154(b) by 276 days.

(21) Appl. No.: 18/628,951

(22) Filed: Apr. 8, 2024

(65) Prior Publication Data

US 2024/0345114 A1 Oct. 17, 2024

Related U.S. Application Data

(60) Provisional application No. 63/495,819, filed on Apr. 13, 2023.

(51) Int. Cl.
*G01N 35/02* (2006.01)
*G01N 1/14* (2006.01)
*G01N 35/00* (2006.01)

(52) U.S. Cl.
CPC ......... *G01N 35/00732* (2013.01); *G01N 1/14* (2013.01); *G01N 2035/00752* (2013.01); *G01N 2035/00831* (2013.01)

(58) Field of Classification Search
CPC ............... G01N 35/00732; G01N 1/14; G01N 2035/00752; G01N 2035/00831; G01N 1/28; G01N 15/14; G01N 35/02; G01N 35/04; G01N 2015/1006; G01N 2035/00742; G01N 1/30; G01N 35/00584; G01N 35/00722; G01N 35/1009; G01N 35/1016; G01N 35/00742; G01N 2035/00772; G01N 2035/00851; G01N 2035/0041; G16H 10/40
USPC .............. 73/61.55, 61.56, 64.5, 863, 863.01, 73/861.21, 864.25, 864.81; 422/62–65, 422/67, 81, 82.01–82.11, 509, 510, 119; 436/43, 174, 180, 808
See application file for complete search history.

(56) References Cited

U.S. PATENT DOCUMENTS

| | | | |
|---|---|---|---|
| 9,701,957 | B2 | 7/2017 | Wilson et al. |
| 2003/0030783 | A1 | 2/2003 | Roche et al. |
| 2008/0113440 | A1 | 5/2008 | Gurney et al. |

(Continued)

FOREIGN PATENT DOCUMENTS

| | | | | |
|---|---|---|---|---|
| WO | WO-2010056903 A1 * | 5/2010 | ............. | G01N 35/04 |
| WO | 2022035382 A1 | 2/2022 | | |
| WO | 2023108061 A1 | 6/2023 | | |

OTHER PUBLICATIONS

CellMek SPS Sample Preparation Instrument, Instructions for Use, Beckman Coulter, Inc., Feb. 2023, 342 pgs.

(Continued)

*Primary Examiner* — Robert R Raevis
(74) *Attorney, Agent, or Firm* — Merchant & Gould P.C.

(57) ABSTRACT

A sample preparation instrument for dispensing processed samples into output tubes is described. The instrument scans specimen-panel assignment barcodes. The instrument associates the output tubes with a panel selected for a specimen. The instrument operates a transfer station to dispense processed samples from the specimen into the output tubes based on the association of the output tubes with the panel.

20 Claims, 15 Drawing Sheets

(56) References Cited

U.S. PATENT DOCUMENTS

| | | | | |
|---|---|---|---|---|
| 2013/0065797 | A1* | 3/2013 | Silbert | G01N 35/1079 73/304 C |
| 2014/0112829 | A1* | 4/2014 | Thomas | G01N 35/026 422/562 |
| 2016/0077118 | A1 | 3/2016 | Silbert et al. | |
| 2020/0103430 | A1 | 4/2020 | Silbert | |
| 2021/0199682 | A1 | 7/2021 | Fernandez De Castro et al. | |

OTHER PUBLICATIONS

Extended European Search Report for Application No. 24169806.7 mailed Aug. 19, 2024.

United Kingdom Intellectual Property Office, Search Report for Application No. GB2405206.0 mailed Sep. 24, 2024, 3 pages.

* cited by examiner

Figure 8:
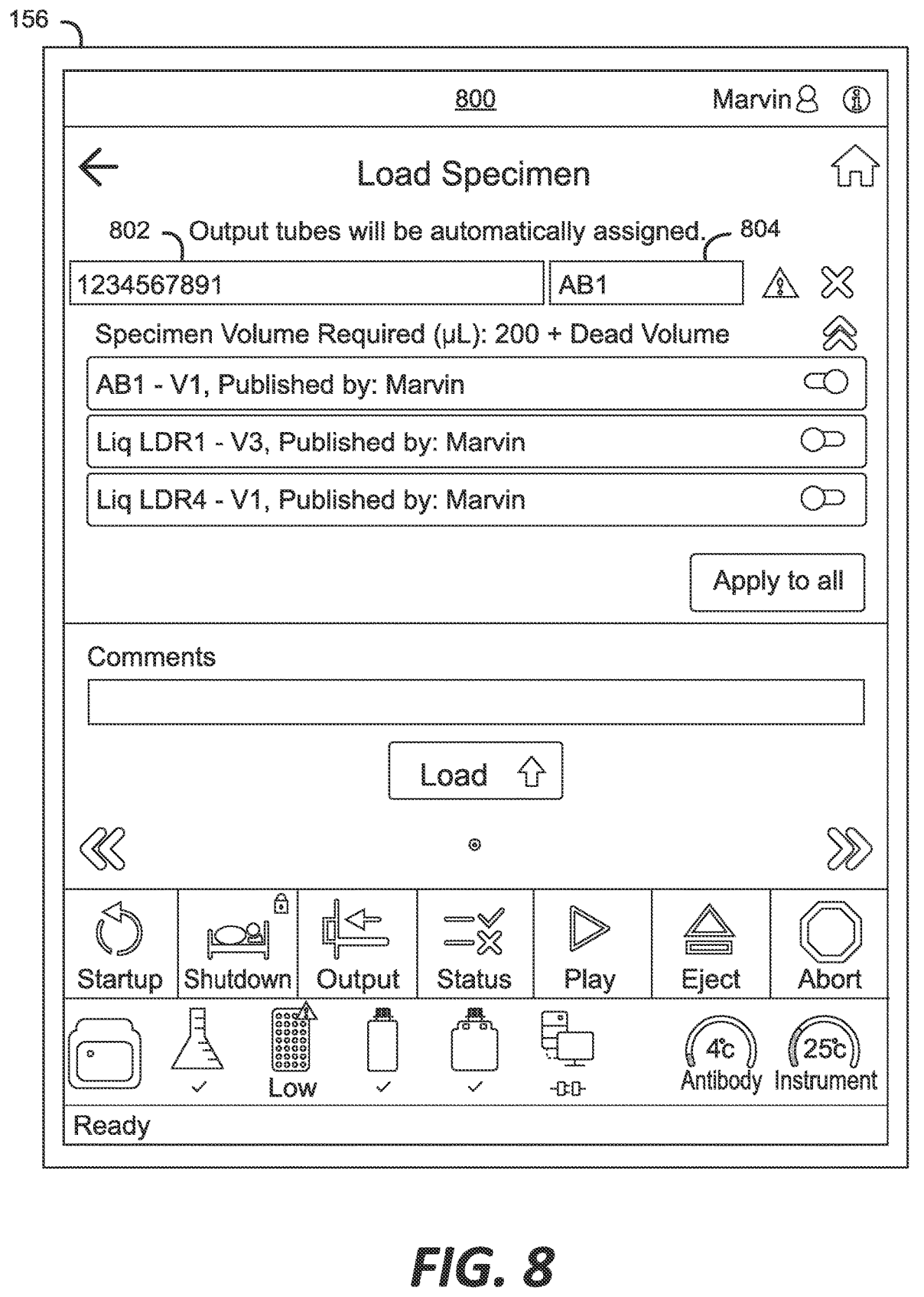

156

800

Marvin

Load Specimen

802 Output tubes will be automatically assigned. 804

1234567891

AB1

Specimen Volume Required (µL): 200 + Dead Volume

AB1 - V1, Published by: Marvin

Liq LDR1 - V3, Published by: Marvin

Liq LDR4 - V1, Published by: Marvin

Apply to all

Comments

Load

Startup Shutdown Output Status Play Eject Abort

Low

4°c Antibody

25°c Instrument

Ready

Figure 13:
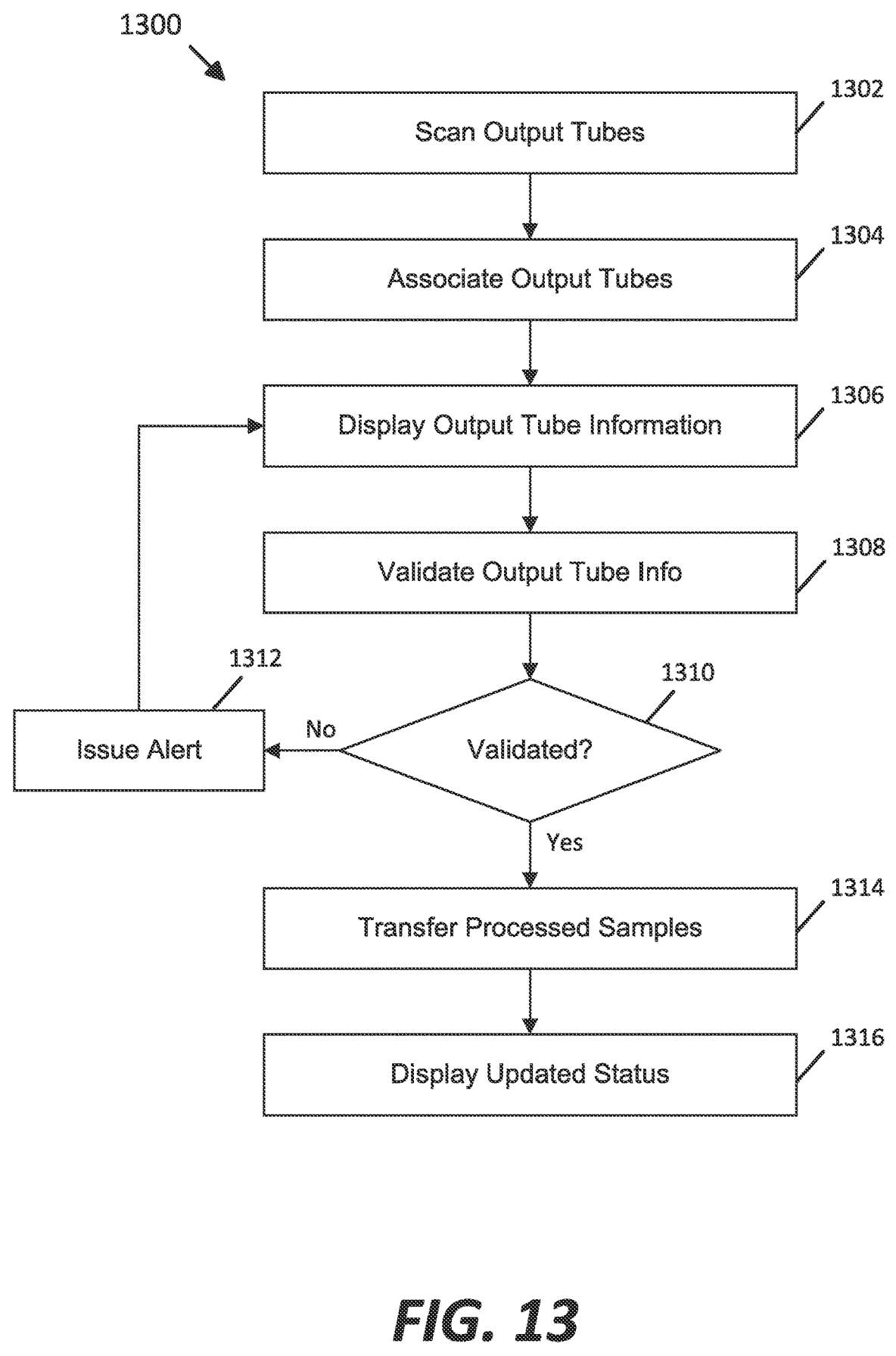

1302 Scan Output Tubes

1304 Associate Output Tubes

1306 Display Output Tube Information

1308 Validate Output Tube Info

1310 Validated?

No

1312 Issue Alert

Yes

1314 Transfer Processed Samples

1316 Display Updated Status

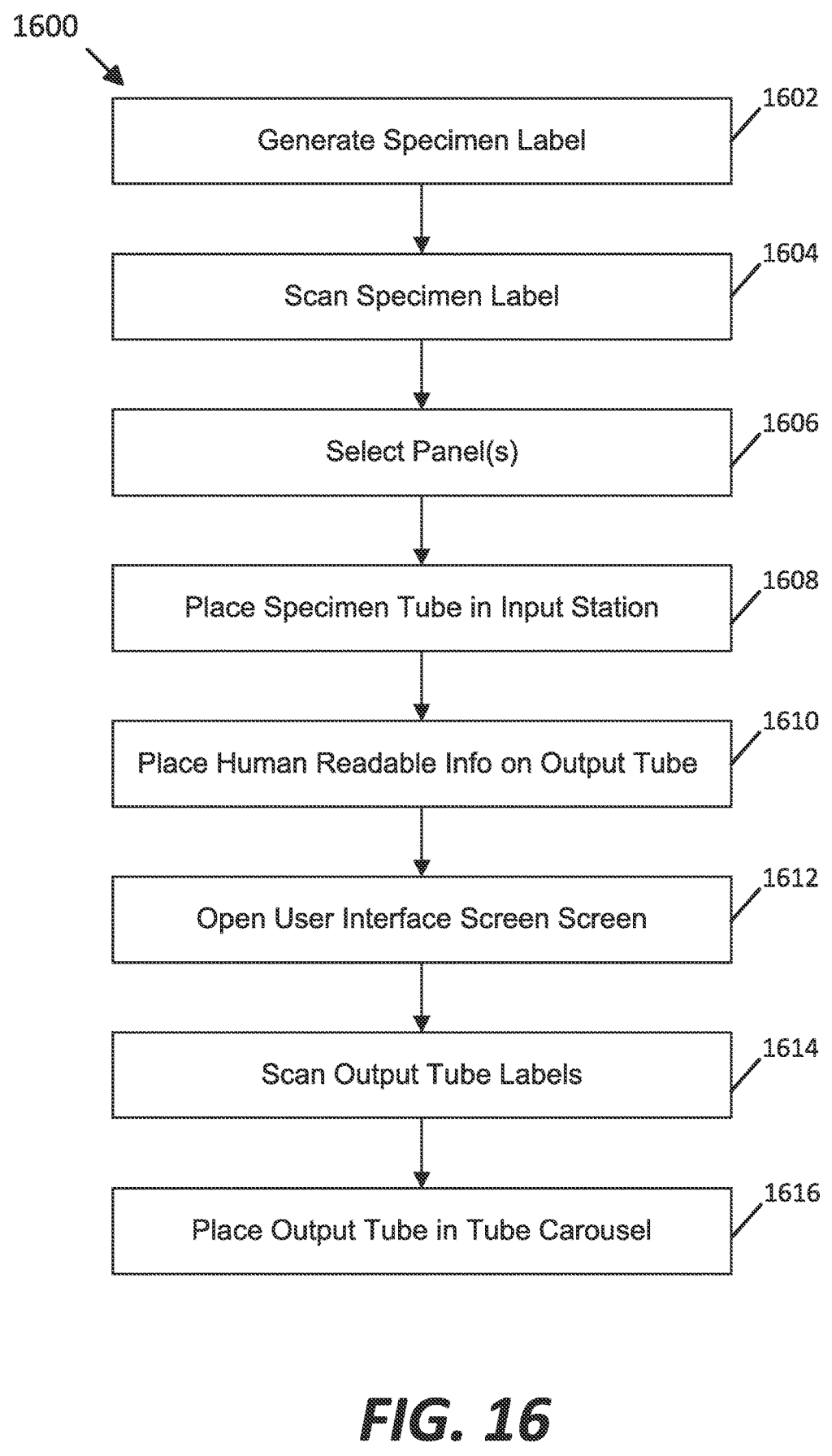

Generate Specimen Label 1602

Scan Specimen Label 1604

Select Panel(s) 1606

Place Specimen Tube in Input Station 1608

Place Human Readable Info on Output Tube 1610

Open User Interface Screen Screen 1612

Scan Output Tube Labels 1614

Place Output Tube in Tube Carousel 1616

FIG. 16

SAMPLE PREPARATION

CROSS-REFERENCE TO RELATED APPLICATIONS

This application claims priority to U.S. Provisional Patent Application 63/495,819 filed Apr. 13, 2023, the disclosure of which is incorporated herein by reference in its entirety.

BACKGROUND

Before a specimen can be analyzed by an instrument such as a flow cytometer or other type of sample analysis instrument, a sample of the specimen must typically be prepared. For example, a sample of the specimen can be prepared by adding a reagent that targets a constituent within the sample to facilitate the analysis.

In some instances, a panel is prepared that typically includes a plurality of samples from the same specimen, each panel having a unique combination of parameters such as volumes of antibodies, fluorochromes, and other reagents for identifying cells of interest and extracting data, as well as additional parameters such as wash cycles and incubation time.

SUMMARY

In general terms, the present disclosure relates to sample preparation. In one possible configuration, a sample preparation instrument dispenses processed samples into preselected output tubes by reading an output tube label that includes a specimen-panel assignment barcode and human-readable information. Various aspects are described in this disclosure, which include, but are not limited to, the following aspects.

One aspect relates to a sample preparation instrument for dispensing processed samples into output tubes, the sample preparation instrument comprising: an input station for receiving one or more specimen tubes; an output station for receiving a tube holder holding the output tubes, each output tube having an output tube label including a specimen-panel assignment barcode and human-readable information; a transfer station operating to move a probe to dispense the processed samples into the output tubes; and a sample preparation computer including one or more processing devices, and a system memory storing software instructions that, when executed by the one or more processing devices, cause the one or more processing devices to: scan the specimen-panel assignment barcodes; associate the output tubes with a panel selected for the specimen; and operate the transfer station to dispense the processed samples into the output tubes based on the association of the output tubes with the panel.

Another aspect relates to a method of dispensing processed samples from a specimen into output tubes, the method comprising: scanning specimen-panel assignment barcodes attached to the output tubes, each of the specimen-panel assignment barcodes encoding data including at least a specimen ID, a panel code, and a tube number; associating the output tubes with a panel selected for the specimen based on the data encoded on the specimen-panel assignment barcodes; and dispensing the processed samples into the output tubes based on the association of the output tubes with the panel.

Another aspect relates to a sample preparation instrument for dispensing processed samples into output tubes, the sample preparation instrument comprising: a sample preparation computer including one or more processing devices, and a system memory storing software instructions that, when executed by the one or more processing devices, cause the one or more processing devices to: scan specimen-panel assignment barcodes attached to the output tubes, each specimen-panel assignment barcode encoding data including at least a specimen ID, a panel code, and a tube number; associate the output tubes with a panel selected for the specimen based on the data encoded on the specimen-panel assignment barcodes; and dispense the processed samples into the output tubes based on the association of the output tubes with the panel.

A variety of additional aspects will be set forth in the description that follows. The aspects can relate to individual features and to combination of features. It is to be understood that both the foregoing general description and the following detailed description are exemplary and explanatory only and are not restrictive of the broad inventive concepts upon which the embodiments disclosed herein are based.

DESCRIPTION OF THE FIGURES

The following drawing figures, which form a part of this application, are illustrative of the described technology and are not meant to limit the scope of the disclosure in any manner.

FIG. 8 illustrates another example of the load specimen screen displayed on the touch display of the sample preparation instrument of FIG. 2.

FIG. 13 schematically illustrates an example of a method of dispensing a processed sample in a preselected output tube performed by the sample preparation instrument of FIG. 2 in accordance with the barcode assigned mode.

FIG. 16 schematically illustrates an alternative example of a method performed by a user of the sample preparation instrument of FIG. 2 under a barcode assigned mode.

DETAILED DESCRIPTION

Figure 1:
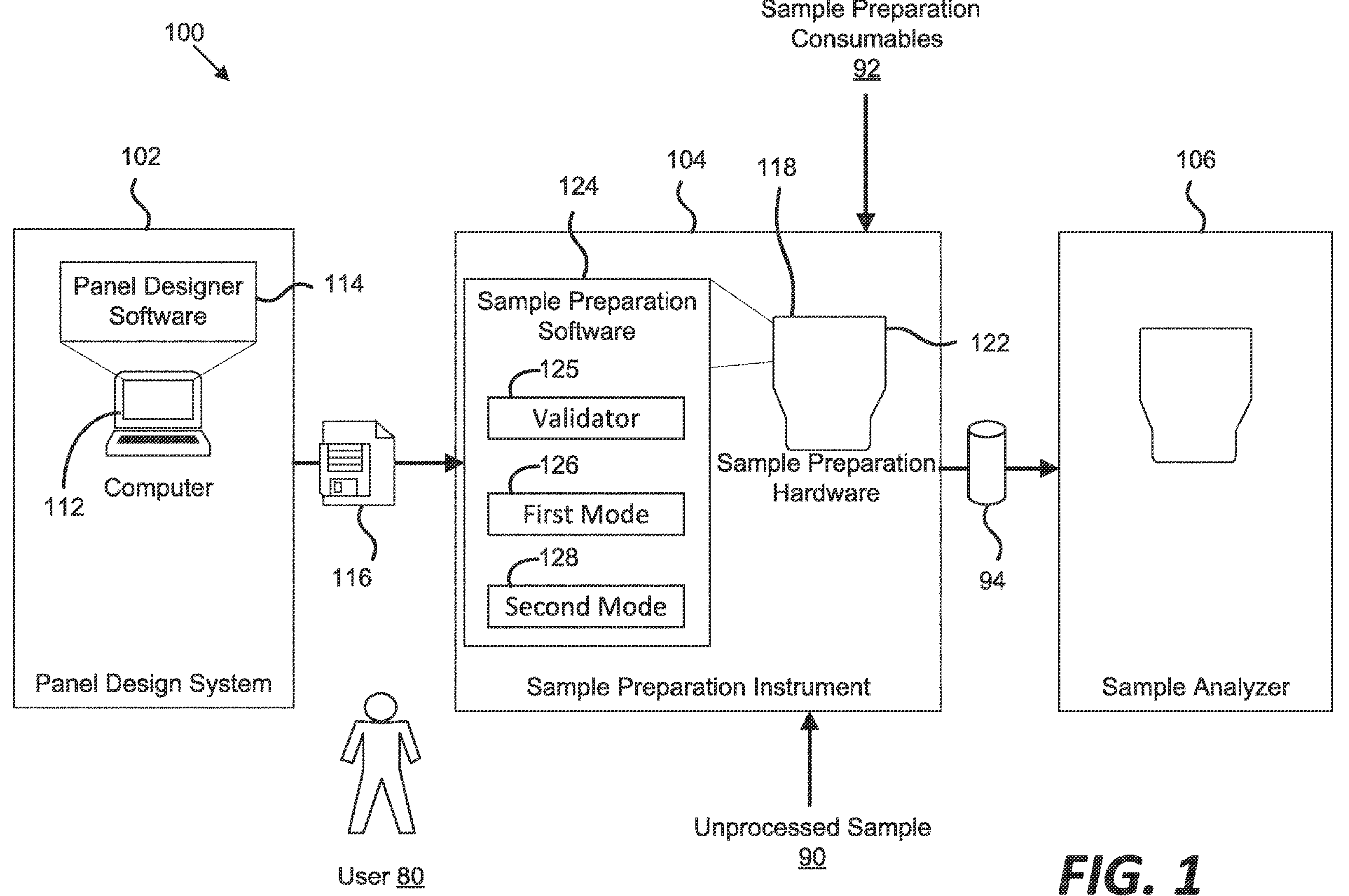
FIG. 1 schematically illustrates an example of a sample analysis system.

FIG. 1 schematically illustrates an example of a sample analysis system 100. The sample analysis system 100 is operable to analyze an unprocessed sample 90, which can include blood, bone marrow, dissociated tissues, peripheral mononuclear cells, fine needle aspirates, cerebrospinal fluid, and other single cell-suspensions. Additional types of samples and combinations thereof can be analyzed by the sample analysis system 100. The sample analysis system 100 can incorporate aspects described in U.S. patent application Ser. No. 17/127,439, filed on Dec. 18, 2020, entitled SAMPLE PREPARATION INSTRUMENT, the disclosure of which is hereby incorporated by reference in its entirety.

The sample analysis system 100 includes a panel design system 102, a sample preparation instrument 104, and a sample analyzer 106. The panel design system 102 can be used to generate a sample specification 116 having a panel of one or more samples from a specimen. The panel can be prepared by the sample preparation instrument 104. The one or more samples within the panel can be analyzed by the sample analyzer 106. The panel design system 102 includes a computer 112 having panel designer software 114 installed thereon.

The panel designer software 114 receives inputs from a user 80 to define the sample specification 116. The sample specification 116 can be subsequently used by the sample preparation instrument 104 to process the unprocessed sample 90 and generate a processed sample 94. In some examples, the panel designer software 114 can include a sample preparation specification validator, which operates to validate the sample specification 116. In some instances, the panel design system 102 incorporates aspects described in PCT Patent Application Number PCT/US2022/081168, filed on Dec. 8, 2022, entitled SAMPLE PREPARATION VALIDATION, the disclosure of which is hereby incorporated by reference in its entirety.

The sample preparation instrument 104 receives the sample specification 116 from the panel design system 102. The sample preparation instrument 104 uses the sample specification 116 to produce one or more processed samples 94 by processing the unprocessed sample 90 using one or more sample preparation consumables 92. The sample preparation instrument 104 includes sample preparation hardware 122 and sample preparation software 124. The sample preparation software 124 is executed by a sample preparation computer 118 to cause the sample preparation hardware 122 to process the unprocessed sample 90 with the sample preparation consumables 92 according to the sample specification 116.

The sample preparation software 124 can include a validator 125, which operates to validate the sample preparation. For example, the sample preparation may utilize sample preparation consumables 92 to prepare the processed sample 94. In such instances, the validator 125 operates to check whether the sample preparation consumables 92 are present and available in sufficient quantities. Also, the sample preparation software 124 is operable to validate a status of the sample preparation hardware 122 with regards to the sample specification 116.

As shown in FIG. 1, the sample preparation software 124 further includes a first mode 126 and a second mode 128 for transferring the processed samples 94 to output tubes held in an output station. In the first mode 126, the output tubes are selected by the sample preparation software 124, such as in the order they are held on a tube holder in the output station. In some examples, the first mode 126 is referred to as an auto assigned mode.

In contrast, the second mode 128 allows a user 80 to select particular output tubes for receiving the processed sample 94, such as output tubes that include human-readable information that identifies the specimen from which the processed sample 94 is derived from. In some examples, the second mode 128 is referred to as a barcode assigned mode.

The sample analyzer 106 analyzes the processed sample 94. In some examples, the sample analyzer 106 is a flow cytometer, a hematology analyzer, or other laboratory instrument.

Figure 2:
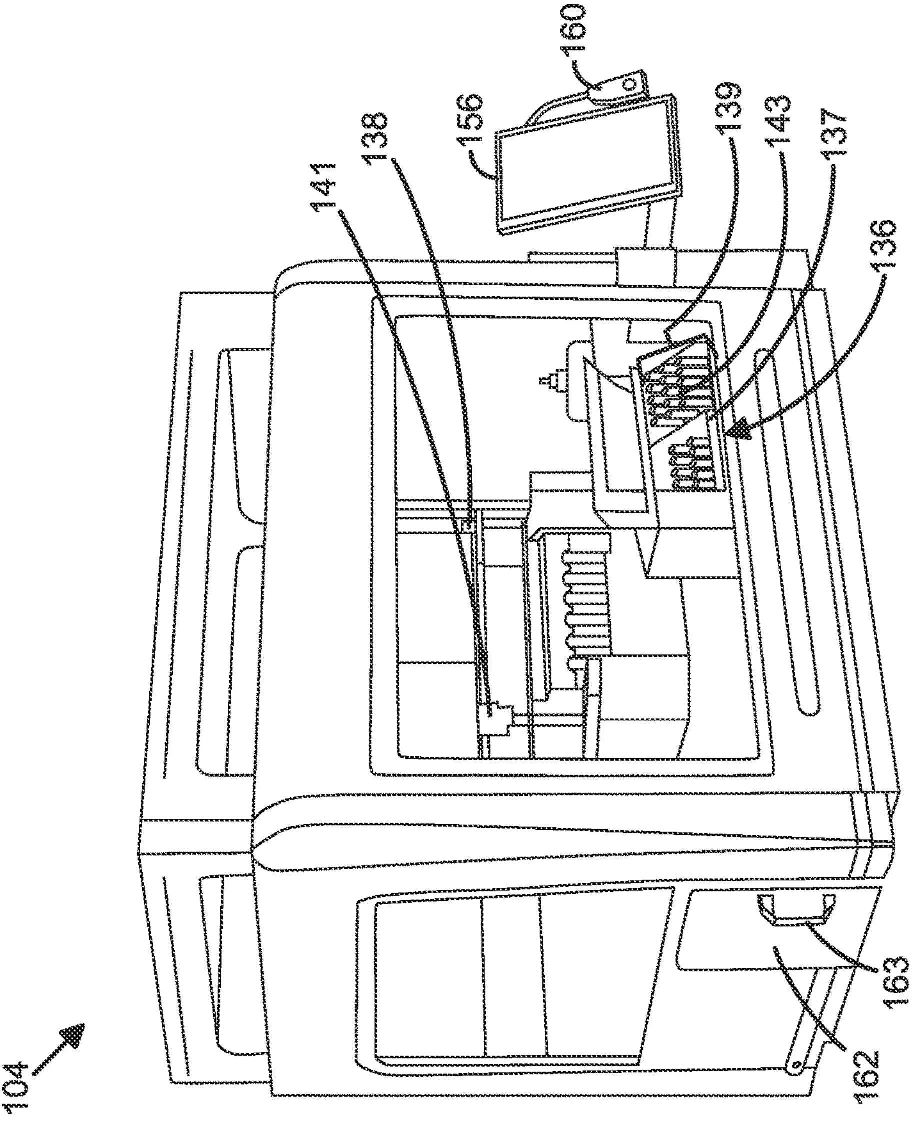
FIG. 2 is an isometric view of an example of a sample preparation instrument in the sample analysis system of FIG. 1.
Figure 3:
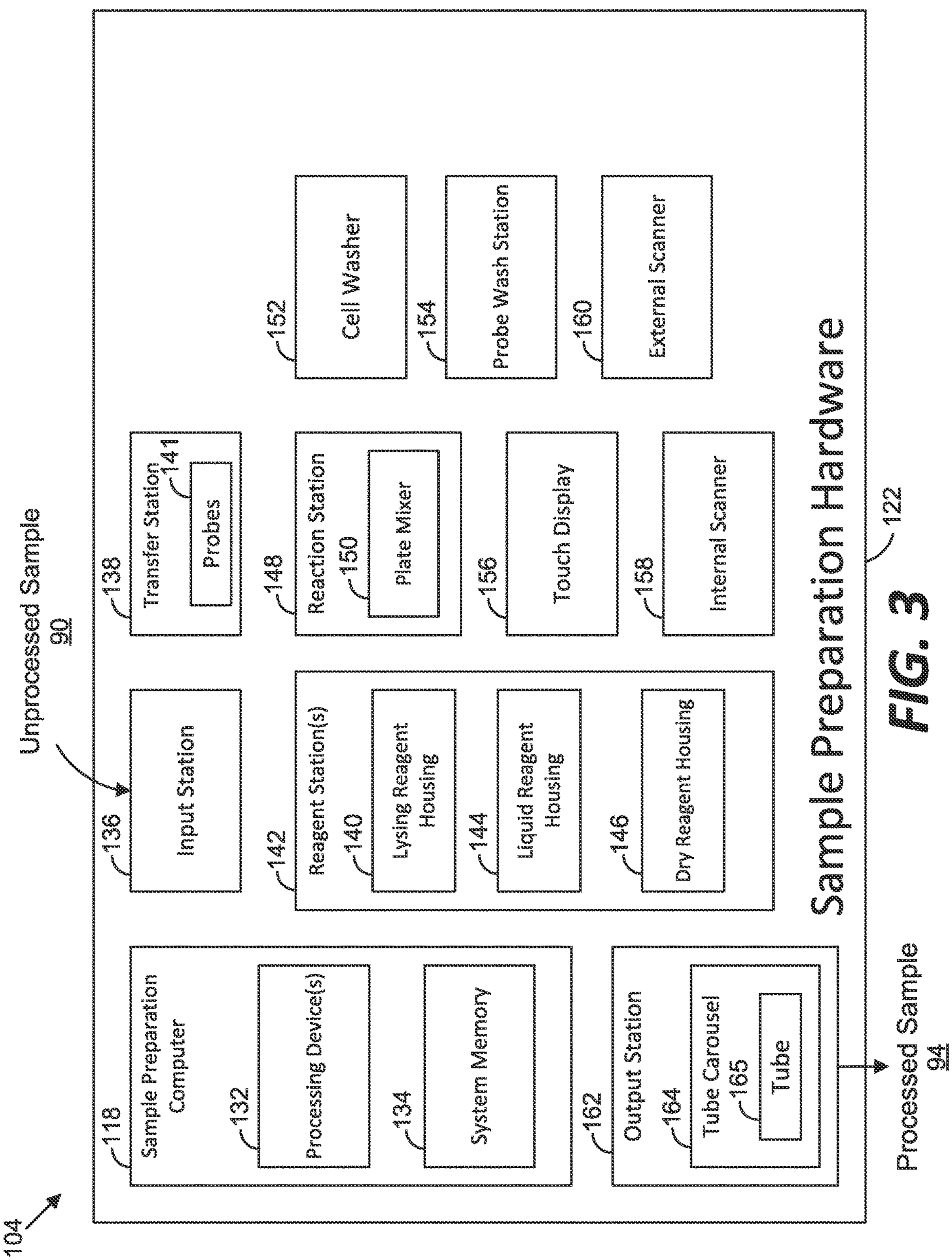
FIG. 3 schematically illustrates an example of sample preparation hardware of the sample preparation instrument of FIG. 2.

FIG. 2 is an isometric view of an example of the sample preparation instrument 104. FIG. 3 schematically illustrates an example of the sample preparation hardware 122 of the sample preparation instrument 104. As shown in FIGS. 1 and 3, the sample preparation hardware 122 includes the sample preparation computer 118, which includes one or more processing devices 132 operatively coupled to a system memory 134. The sample preparation computer 118 is an example of a controller and an information processor of the sample preparation instrument 104. In some examples, the sample preparation computer 118 stores previously designed panels received from a remote computing device such as the panel design system 102. For example, a user, such as a laboratory technician or analyst, can utilize a panel designing and management application, such as the panel designer software 114, installed on a remote computing device, such as the panel design system 102, to design panels for different types of specimens and different types of analysis for execution by the sample preparation instrument 104. The designed panels can then be transmitted to the sample preparation instrument 104 over a network or wired connection or a physical memory device such as a USB drive.

In other examples, the sample preparation computer 118 can execute a panel designing and management application, such as the panel designer software 114, to allow the user to design a panel using the sample preparation instrument 104 such as on user interfaces provided via a touch display 156 of the sample preparation instrument 104 (see FIG. 2), where the designed panels are stored by the sample preparation computer 118. Each panel can define a particular workflow to be performed when preparing a sample of a specimen for the panel. For example, the panel can include a set of rules defining the workflow associated with sample preparation, hereinafter referred to as the set of predefined rules.

The sample preparation computer 118, by operating the sample preparation software 124, can display the designed panels on a specimen loading user interface to enable a user to select one or more of the panels to pair with a received specimen. In some examples, the specimen loading user interface can be displayed on the touch display 156 of the sample preparation instrument 104. The selected one or more panels can then be used to manage the operations of the sample preparation instrument 104 to generate the processed sample 94. For example, the set of predefined rules associated with each panel can provide an order of operations, a type, and a volume amount of specimen and reagent involved in each operation, a time associated with each operation, and components of the sample preparation instrument 104 involved in each operation, among other examples. Based on the selected one or more panels, the sample preparation computer 118 can generate signals for transmission to respective components of the sample preparation instrument 104 that provide instructions for executing the operations.

Additionally, the sample preparation computer 118 can operate with the cell concentration estimator 166 (see FIG. 5) to determine a white blood cell concentration in the specimen. Alternatively, cell concentration values are supplied by a laboratory information system (LIS), or the user 80 can enter this information into a load specimen screen displayed on the touch display 156. Based on a set of predefined rules associated with one or more selected panels, the sample preparation computer 118 determines a sample volume of the specimen based on the white blood cell concentration estimate, and whether the specimen should be diluted. Alternatively, the selected panels may specify fixed specimen volumes that are not dependent on the white cell concentration.

Still referring to FIG. 3, the one or more processing devices 132 can include central processing units (CPUs), digital signal processors, field-programmable gate arrays, and other types of electronic computing circuits. In some instances, the one or more processing devices 132 are part of a processing circuitry having a memory for storing instructions which, when executed by the processing circuitry, cause the processing circuitry to perform the various aspects, features, and functionalities described herein.

The system memory 134 can include a random-access memory ("RAM") and a read-only memory ("ROM"). Basic input and output logic having basic routines that help to transfer information between elements within the sample preparation computer 118, such as during startup, can be stored in the ROM. The system memory 134 can also include a mass storage device that can store an operating system, software instructions, and data. The mass storage device can be connected to the one or more processing devices 132 through a system bus. The mass storage device and associated computer-readable data storage media provide non-volatile, non-transitory storage for the sample preparation computer 118.

Although the description of computer-readable data storage media contained herein refers to the mass storage device, it should be appreciated by those skilled in the art that computer-readable data storage media can be any available non-transitory, physical device or article of manufacture from which the sample preparation computer 118 can read data and/or instructions. The computer-readable storage media can be comprised of entirely non-transitory media. The mass storage device is an example of a computer-readable storage device.

Computer-readable data storage media include volatile and non-volatile, removable, and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid-state memory technology, or any other medium which can be used to store information, and which can be accessed by the device.

Figure 4:
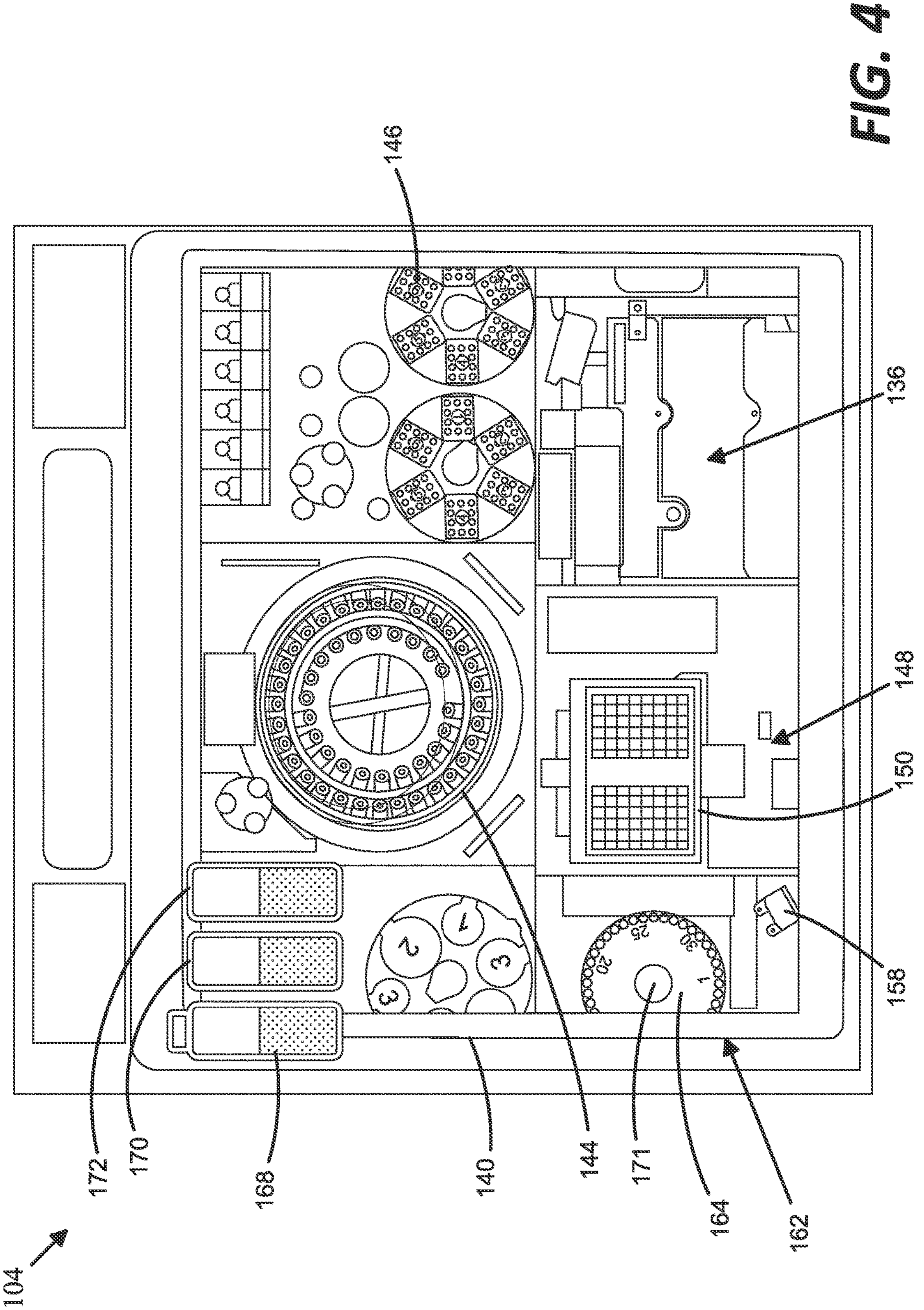
FIG. 4 is cross-sectional planar view of the sample preparation instrument of FIG. 2.
Figure 5:
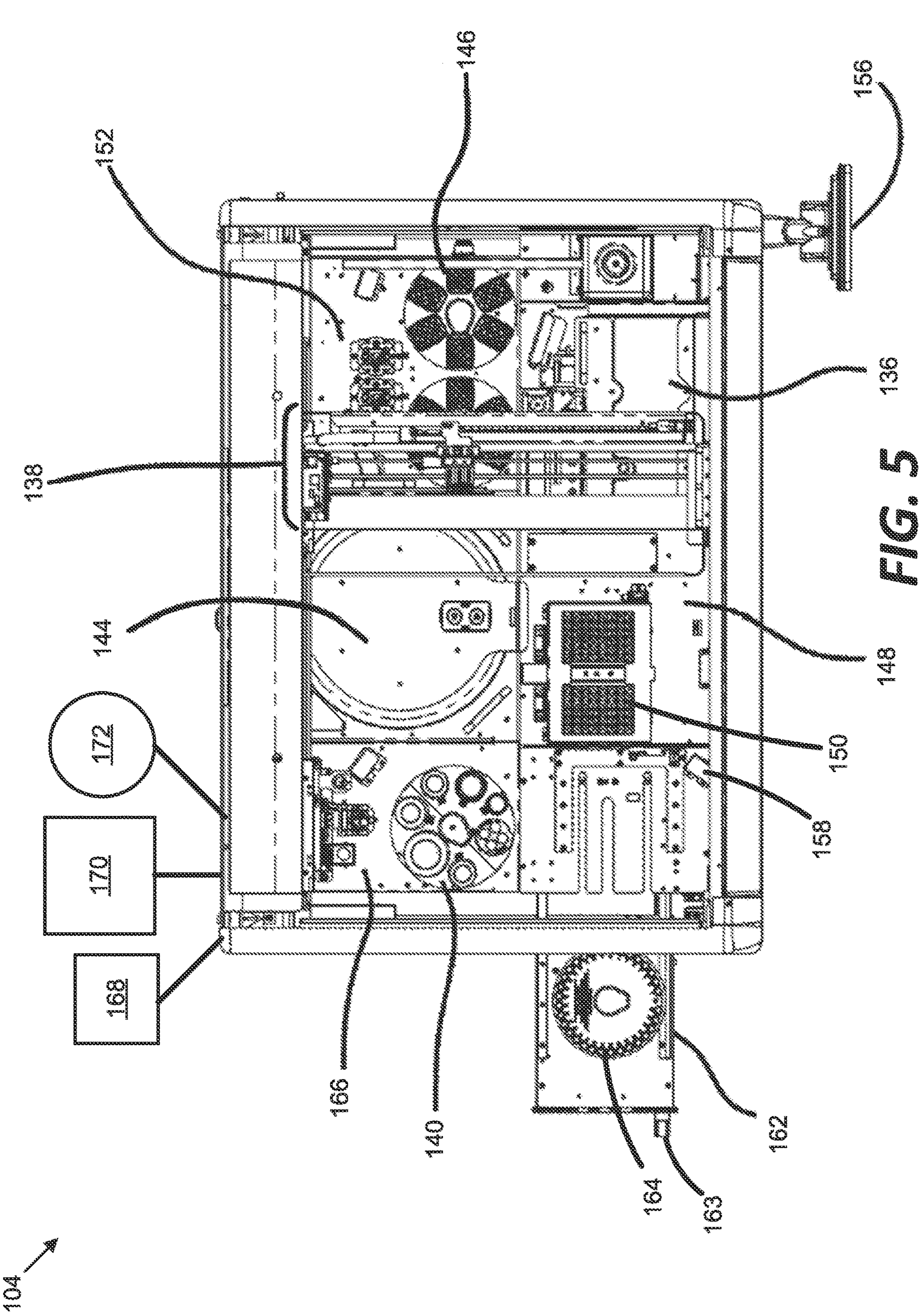
FIG. 5 is another cross-sectional planar view of the sample preparation instrument of FIG. 2, which shows an output station partially removed from the instrument.

FIG. 4 is cross-sectional planar view of the sample preparation instrument 104. FIG. 5 is another cross-sectional planar view of the sample preparation instrument 104. Referring now to FIGS. 2-5, the sample preparation hardware 122 further includes an input station 136. The input station 136 can receive an input cassette 137 inserted into the sample preparation instrument 104 by the user 80. The input cassette 137 can hold one or more specimen tubes 139. In some examples, each specimen tube 139 comprises a different specimen (e.g., a specimen from a different patient). In some examples, each specimen tube 139 is associated with a unique machine-readable label that can be scanned by the external scanner 160 to identify a specimen within the tube. For example, the user 80 can use an external scanner 160 to read a specimen machine-readable label 143 attached to each specimen tube 139. Examples of the specimen machine-readable labels 143 can include a barcode, a QR code, RF ID, and the like.

The sample preparation hardware 122 includes a transfer station 138 that operates to move one or more probes 141 above other components inside the sample preparation instrument 104. The transfer station 138 can include a gantry that is powered by one or more motors to move the one or more probes 141 above one or more reagent stations 142 including a lysing reagent housing 140, a liquid reagent housing 144, and a dry reagent housing 146. The transfer station 138 can further move the one or more probes 141 above plate mixers 150 inside a reaction station 148, and above a cell washer 152 and a cell concentration estimator 166. The gantry of the transfer station 138 can be powered by one or more servo motors, stepper motors, and/or other types of motors.

The one or more probes 141 can aspirate, transport, and dispense various substances including samples of specimens from the specimen tubes 139 held in the input station 136, labeling reagents stored in the liquid reagent housing 144 or the dry reagent housing 146, lytic reagents stored in the lysing reagent housing 140, diluent reagents stored on a cart below the sample preparation instrument 104, and other substances for mixing with the samples of the specimens. The one or more probes 141 can also aspirate, transport, and dispense the samples into a cell washer 152. The probes 141 can pierce capped or sealed tubes, vials, cartridges, bottles, or other similar containers to aspirate the substances within, and can be inserted into open-top tubes, vials, cartridges, bottles, or other similar open-top containers to dispense the substances therein. The sample preparation hardware 122 can further include a probe wash station 154 for washing the one or more probes 141.

The one or more probes 141 can dispense the substances into a plate mixer 150 held in a reaction station 148. After a desired mixture is complete, the one or more probes 141 can be used to aspirate the mixture from the plate mixer 150, and thereafter transfer and dispense the mixture into an output tube 165 held in a tube holder 164 in an output station 162.

As shown in FIGS. 4 and 5, the sample preparation hardware 122 can further include a waste container 168, a condensate collector 170, and a diluent reagent container 172. Waste associated with the sample preparation process, including the specimen waste from the cell concentration estimator 166 is dispensed to the waste container 168. Diluent reagent held in the diluent reagent container 172 can be used in several steps in the preparation process, including to estimate cell concentration, reconstitute dry reagent, and other steps. The condensate collector 170 collects condensation resulting from a cooling of the labeling reagents. The waste container 168, the condensate collector 170, and the diluent reagent container 172 can be housed in a separate cart that is not physically located inside the sample preparation instrument 104, but is connected to the system with fluidic tubing and electrical connections.

As shown in FIGS. 2 and 5, the output station 162 includes a handle 163 that allows the user 80 to pull the output station 162 outside of the sample preparation instrument 104. This provides access to the tube holder 164, which allows the user 80 to remove the output tubes 165 from the tube holder 164 such as when the processed samples 94 has been added to the output tubes 165 in accordance with the sample specification 116 performed by the sample preparation instrument 104. Also, this allows the user 80 to add empty output tubes to the tube holder 164. As will now be explained in more detail, the user 80 can select on the touch display 156 the second mode 128, which allows the user 80 to specify the particular output tubes for the sample preparation instrument 104 to dispense the processed samples 94 therein. It can sometimes be desirable for the user 80 of the sample preparation instrument 104 to select the output tubes for transferring the processed sample 94, such as when the output tubes are labeled with human-readable information such as specimen identification, panel name, tube name, and the like to identify the processed samples 94 more easily in the lab.

The sample preparation software 124, which can be stored on the system memory 134, includes the second mode 128 that can be executed by the sample preparation computer 118 to allow the user 80 to specify which output tubes will be used to receive processed samples 94 from a specimen tube 139 held in the input station 136 of the sample preparation instrument 104. As discussed above, the second mode 128 can be referred to as a barcode assigned mode.

In the barcode assigned mode, the user 80 can attach labels on the output tubes that include a machine-readable label (e.g., a barcode, a QR code, RF ID, and the like) that identifies the specimen, panel, and output tube. The label can further include human-readable information such as specimen name/ID, panel name, tube name/index, and other information that can be used by the user and other users in the laboratory to identify the processed sample 94. In the barcode assigned mode, the sample preparation instrument 104 transfers the processed samples 94 only to output tubes that have labels that correctly match the specimen and the panel of the processed samples 94 to improve the user's ability to identify output tubes containing samples after the output tubes have been removed from the sample preparation instrument 104.

Figure 6:
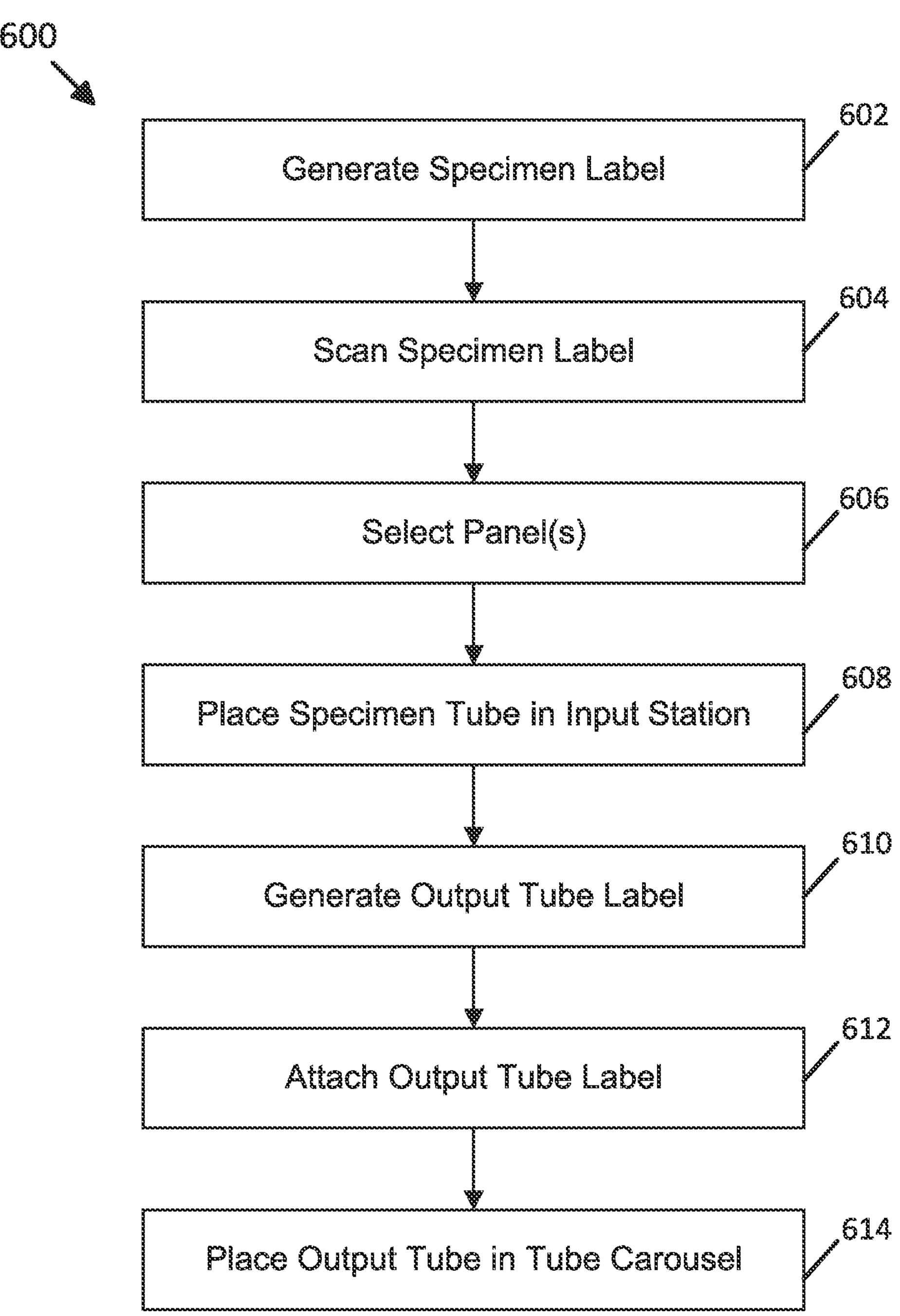
FIG. 6 schematically illustrates an example of a method performed by a user of the sample preparation instrument of FIG. 2 under a barcode assigned mode.

FIG. 6 schematically illustrates an example of a method 600 performed by the user 80 of the sample preparation instrument 104 under a barcode assigned mode. The method 600 has an operation 602 of generating and attaching a specimen machine-readable label 143 on a specimen tube 139. The specimen machine-readable label 143 can include a one-dimensional barcode, or a two-dimensional barcode such as a QR code, Data Matrix square or rectangle, Aztec code, RF ID, and the like. The specimen machine-readable label 143 includes a specimen ID that identifies the specimen. For example, the specimen ID can include a unique number that is assigned by the laboratory or the hospital in order to track samples from a particular patient.

Next, the method 600 includes an operation 604 of scanning the specimen machine-readable label 143 such that the sample preparation instrument 104 identifies the specimen held in the specimen tube 139. As an illustrative example, the user 80 can use an external scanner 160 (see FIGS. 2 and 3) to scan the specimen machine-readable label 143.

Next, the method 600 includes an operation 606 of selecting one or more panels to be prepared by the sample preparation instrument 104 using the specimen. As an illustrative example, the one or more panels can be selected on a load specimen user interface displayed on the touch display 156 of the sample preparation instrument 104 (see FIG. 2).

Figure 7:
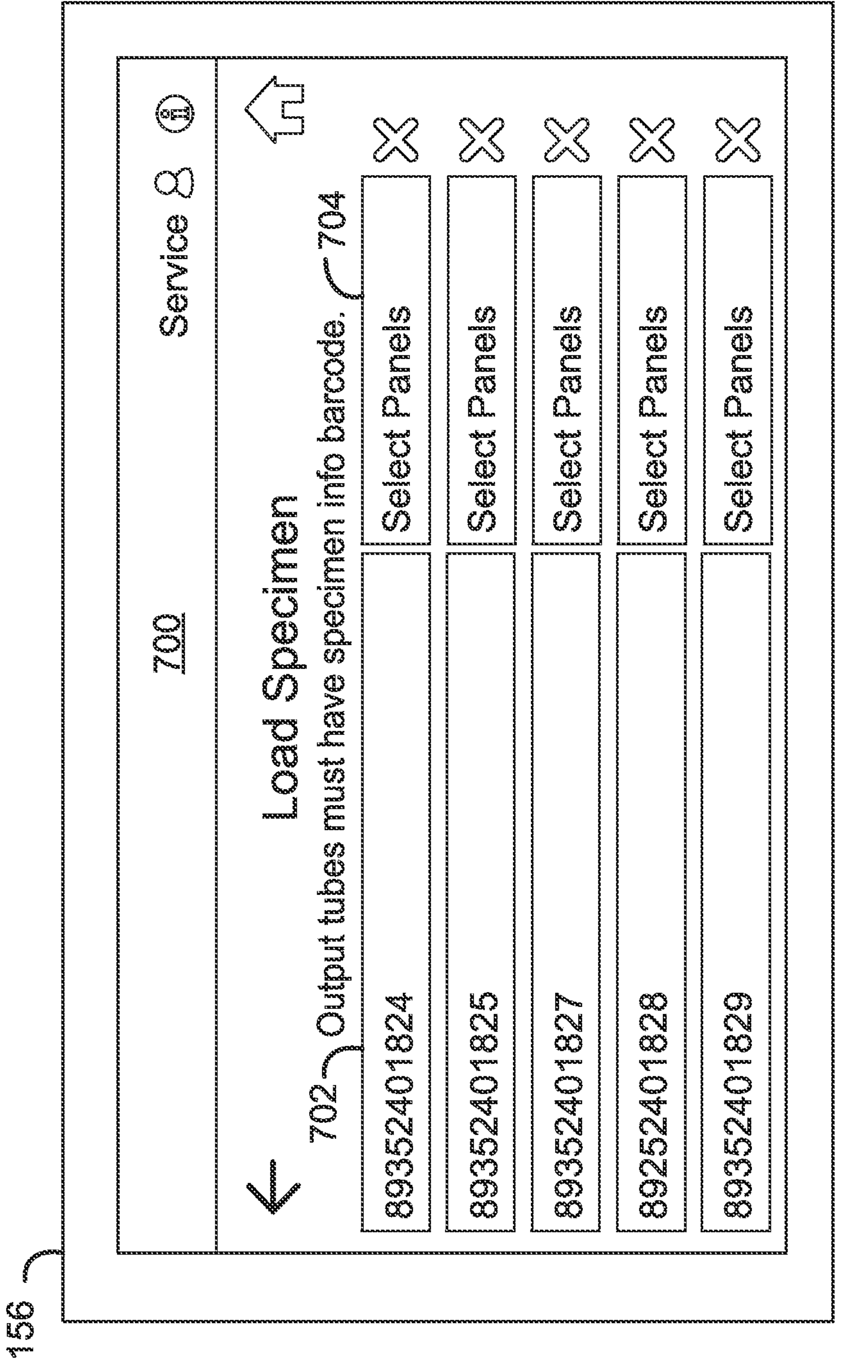
FIG. 7 illustrates an example of a load specimen screen displayed on a touch display of the sample preparation instrument of FIG. 2.
Figure 9:
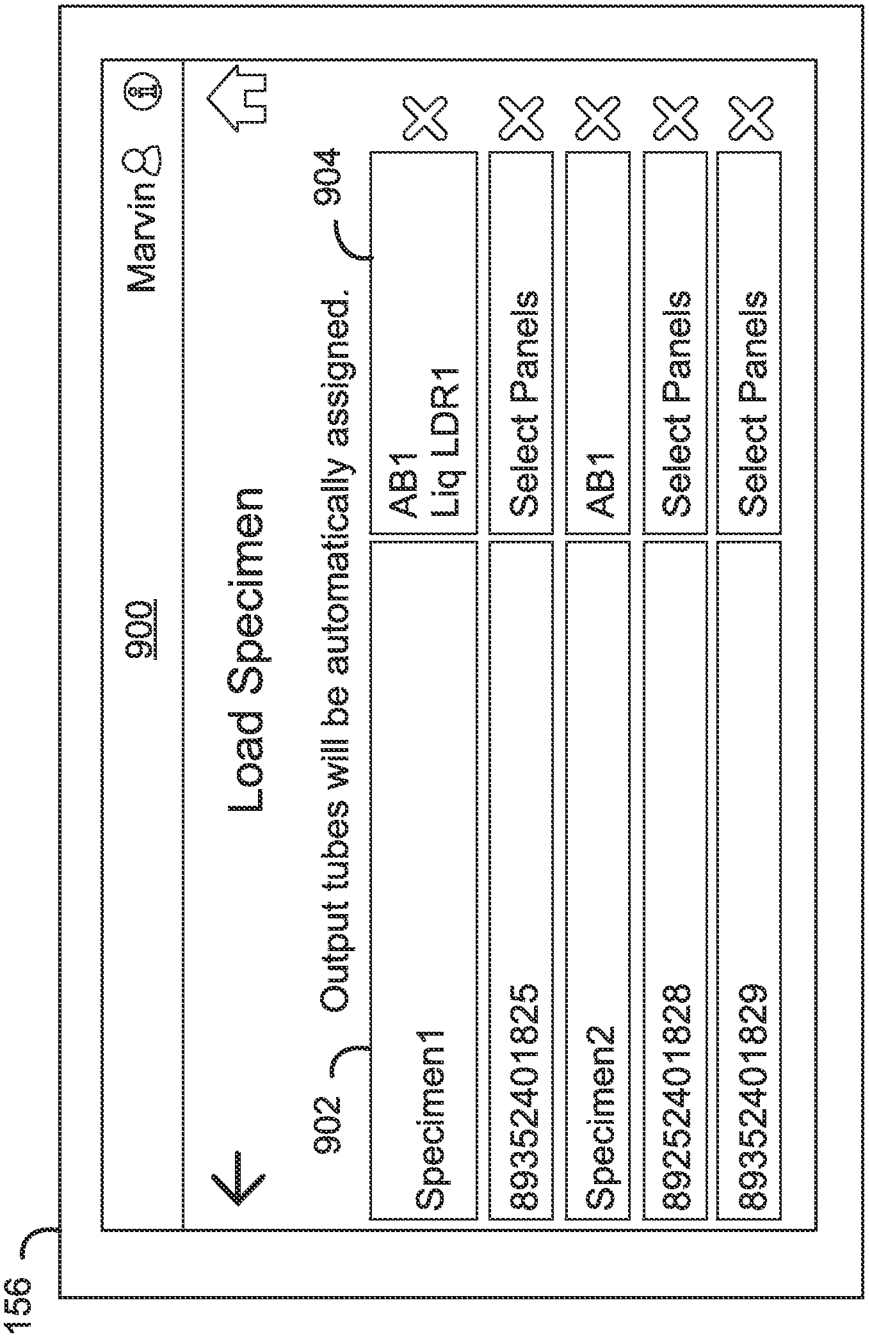
FIG. 9 illustrates another example of the load specimen screen displayed on the touch display of the sample preparation instrument of FIG. 2.

FIG. 7 illustrates an example of a load specimen user interface 700 that can be displayed on the touch display 156 of the sample preparation instrument 104. FIG. 8 illustrates another example of a load specimen user interface 800 that can be displayed on the touch display 156 of the sample preparation instrument 104. FIG. 9 illustrates a further example of a load specimen user interface 900 that can be displayed on the touch display 156 of the sample preparation instrument 104. Referring now to FIGS. 7-9, when the user 80 scans the specimen machine-readable label 143 using the external scanner 160, a field 702, 802, 902 is populated with the specimen ID. As shown in FIGS. 7 and 9, a plurality of fields 702, 902 can be populated for loading a plurality of specimens into the input station 136.

The user 80 can then select a field 704, 804, 904 for selecting one or more panels for each specimen ID populated in the field 702, 802, 902. For example, FIG. 8 illustrates a panel named "AB1" is selected for a given specimen ID (e.g., "1234567891"). Additional panels (e.g., "Liq LDR1", "Liq LDR4", etc.) can also be selected for the given specimen ID. As shown in FIG. 9, multiple specimens can be loaded into the input station 136 of the sample preparation instrument 104, and one or more panels can be selected for each of the loaded specimens.

Referring back to FIG. 6, the method 600 includes an operation 608 of placing the specimen tube 139 (with the specimen machine-readable label 143 attached thereto) into the input station 136. FIG. 2 shows an example of a plurality of specimen tube 139 placed in the input station 136 of the sample preparation instrument 104.

Next, the method 600 includes an operation 610 of generating one or more output tube labels for attaching to one or more output tubes 165. The number of output tube labels that are generated in operation 610 can depend on the number of output tubes that are needed for completion of the one or more panels selected for the specimen.

Figure 10:
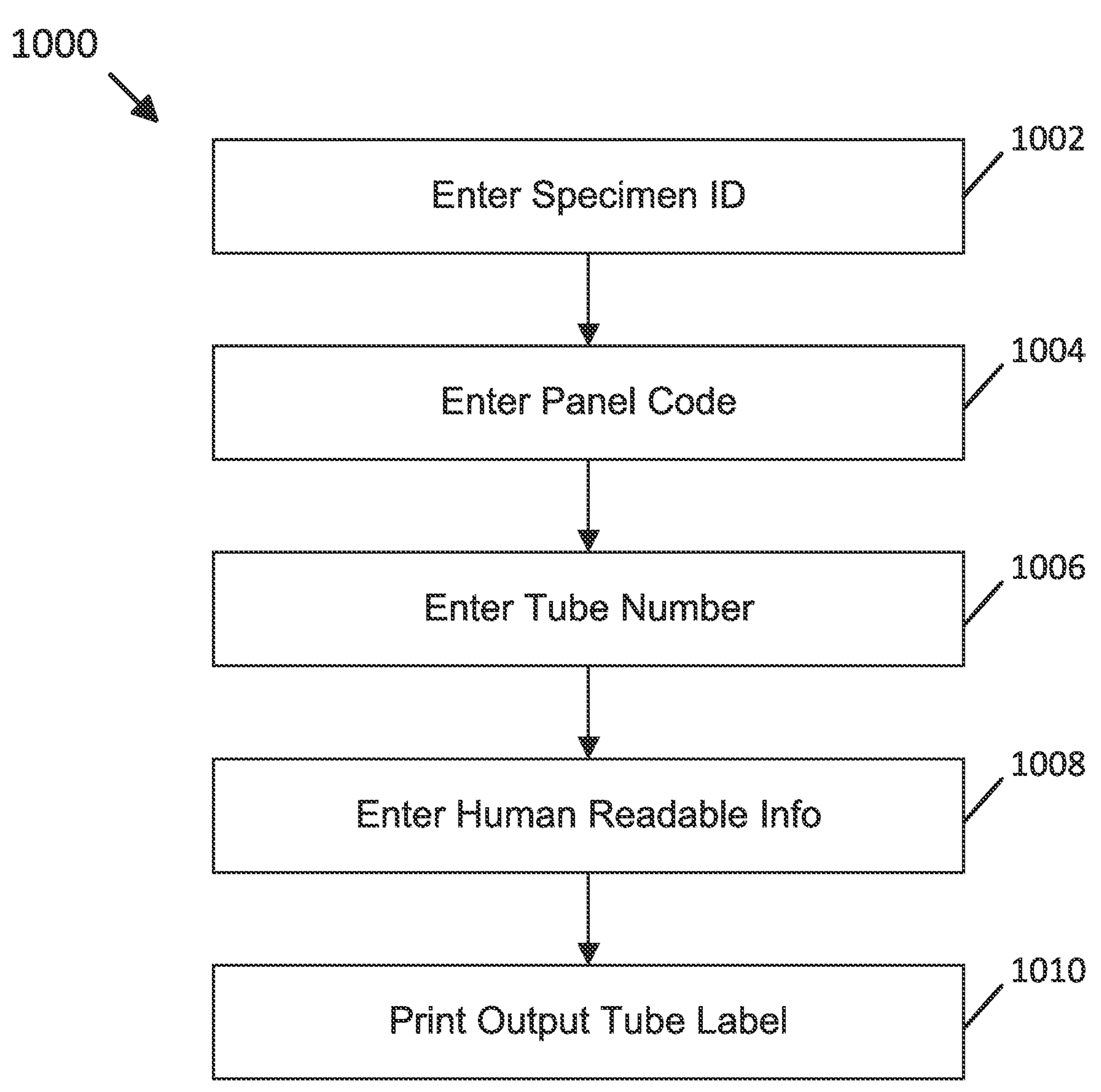
FIG. 10 schematically illustrates an example of a method of generating an output tube label that can be performed as part of the method of FIG. 6.

FIG. 10 schematically illustrates an example of a method 1000 of generating an output tube label that can be performed in operation 610 of the method 600. The method 1000 can be performed by the user 80 of the sample preparation instrument 104 to enter information into a printing device that can be on-board or external to the sample preparation instrument 104.

As shown in FIG. 10, the method 1000 includes a step 1002 of entering the specimen ID. In some examples, the specimen ID is entered by scanning the specimen machine-readable label 143 using an external scanner. Alternatively, the specimen ID can be manually entered, or can be uploaded electronically from a laboratory information system (LIS) or an electronic file.

Next, the method 1000 includes a step 1004 of entering a panel code, which can be an alphanumeric code that uniquely identifies a panel selected for the specimen ID. The panel code must be separated from the specimen ID by a pipe symbol "I" or by another symbol to signal where the specimen ID ends and where the panel code begins within the machine-readable code that can be scanned by the sample preparation instrument 104. The indication of where the specimen ID ends and where the panel id begins can alternatively be determined in the sample preparation software 124 by counting the number of characters in the machine-readable code.

Next, the method 1000 includes a step 1006 of entering a tube number, which can be a digit number representing the output tube order in the panel. For example, in a four-tube panel, the second tube will have a tube number of 2. The tube number can be separated from the panel code by a pipe symbol "|" or by another symbol. The printing device can combine the specimen ID, the panel code, and the tube number to form a unique machine-readable code that can be scanned by the sample preparation instrument 104 for identifying the output tube 165. In some examples, the machine-readable code generated from the information entered in steps 1002-1006 is a two-dimensional code such as a QR code, a Data Matrix square or rectangle code, an Aztec code, RF ID, and the like.

Next, the method 1000 includes a step 1008 of entering human-readable information to help visually identify the output tube 165. The human-readable information can also be displayed based on the specimen ID, the panel code, and the tube number entered in the previous steps. The space remaining in the output tube label after including the machine-readable code can be used to display the human-readable information. For example, the specimen ID, the panel code, and the tube number can be included in the human-readable information to help the user 80 to identify the contents inside the output tube 165 after completion of the one or more panels by the sample preparation instrument 104. The human-readable information can also include the patient's name, and other relevant information for identifying the contents of the output tube 165.

Next, the method 1000 includes a step 1010 of printing the output tube label. The user 80 can use a printing device to print the output tube label. In some examples, the user 80 enters the specimen ID, panel code, tube number, and human-readable information into the printing device. In such examples, the printing device generates the machine-readable code and prints the output tube label. In other examples, the user 80 enters the specimen ID, panel code, tube number, and human-readable information into the sample preparation instrument 104, which can send this information to the printing device for printing the output tube label. In yet some further examples, the sample preparation instrument 104 can include the printing device for printing the output tube label, as well as for printing the specimen label and any other labels as needed.

Referring back to FIG. 6, the method 600 includes an operation 612 of attaching the output tube label to the output tube 165. The output tube label can be an adhesive label that is peeled from a liner to expose a surface having an adhesive for attaching to the output tube 165. Additional means for attaching the output tube label to the output tube 165 are possible. For example, it is possible to print the machine-readable code and the human-readable information directly to the surface of the output tube 165 such that it is not necessary to print and adhere an output tube label. When the output tube label is attached to the output tube 165, the output tube 165 becomes a preselected output tube because the user 80 has preselected the output tube 165 for receiving a particular processed sample prepared by the sample preparation instrument 104. Thereafter, the method 600 includes an operation 614 of placing the output tube 165 into the tube holder 164, and inserting the tube holder 164 into the sample preparation instrument 104.

Figure 11:
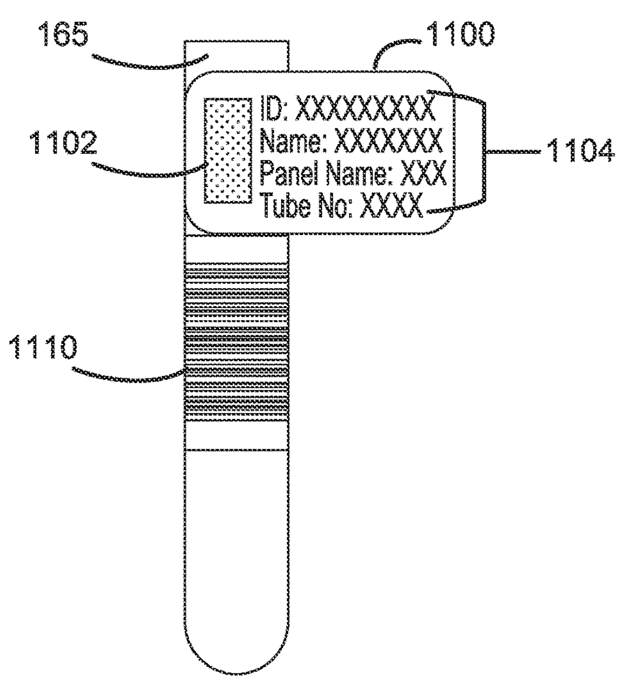
FIG. 11 illustrates an example of an output tube label attached to an output tube; the output tube label generated according to the method of FIG. 10.

FIG. 11 illustrates an example of an output tube label 1100 attached to an output tube 165. The output tube label 1100 is generated according to the steps described in the method 1000. The output tube label 1100 includes a specimen-panel assignment barcode 1102 that encodes data relevant to the processed samples 94 including at least a specimen ID, a panel code, and a tube number. The specimen-panel assignment barcode 1102 is scanned by one or more internal scanners 158 of the sample preparation instrument 104. As shown in FIGS. 3-5, the one or more internal scanners 158 can be stationary relative to the tube holder 164 which rotates about an axis 171.

The output tube label 1100 further includes human-readable information 1104 that can be read and interpreted by a human such as the user 80. The human-readable information 1104 can include information such as the specimen ID, the specimen's name, the panel code or name, and the tube number to help human users to identify the contents in the output tube 165.

As shown in FIG. 11, a tube barcode 1110 can be attached to the output tube 165. The tube barcode 1110 can be attached during manufacture of the output tube 165. The tube barcode 1110 includes a random alphanumeric code that uniquely identifies the output tube 165. The tube barcode 1110 can be a linear, one-dimensional barcode. The tube barcode 1110 can be scanned by the one or more internal scanners 158 of the sample preparation instrument 104 to identify the output tube 165. The sample preparation instrument 104 can link or associate the tube barcode 1110 with the specimen-panel assignment barcode 1102. The link or association between the tube barcode 1110 and the specimen-panel assignment barcode 1102 can be used to track the output tube 165 and the processed sample 94 contained therein during sample processing by the sample preparation instrument 104, as well as during analysis by the sample analyzer 106.

Figure 12:
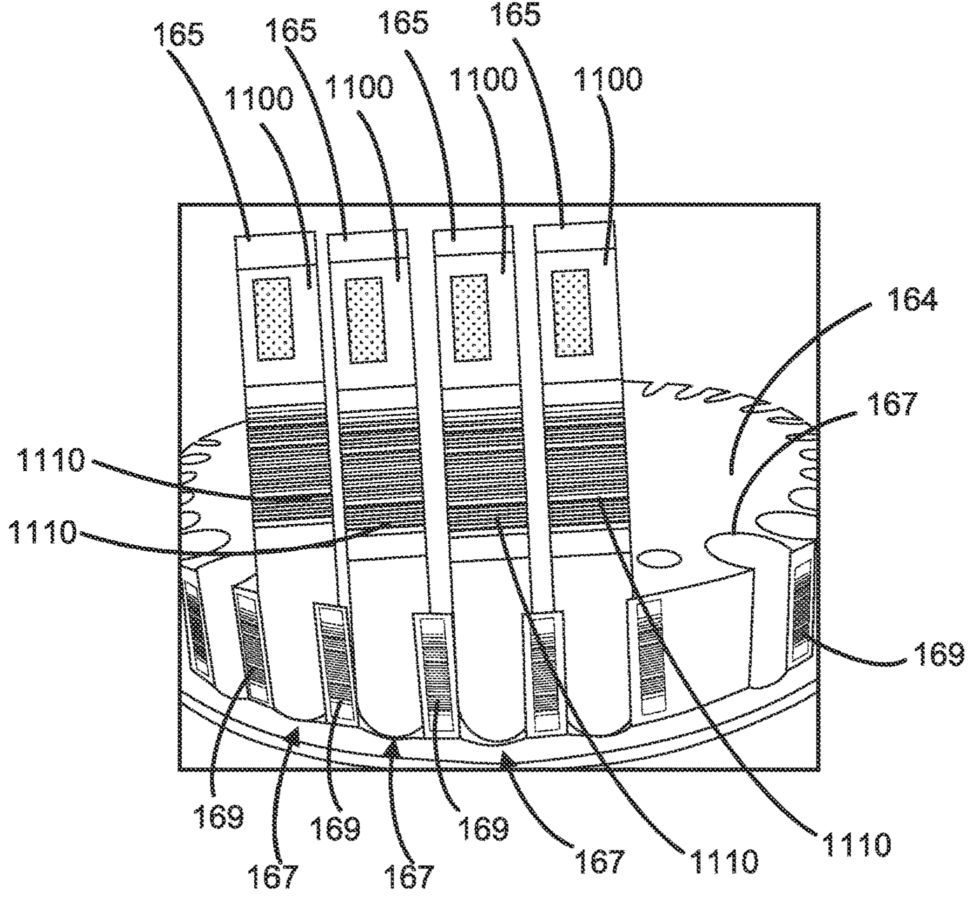
FIG. 12 illustrates an example of output tubes held on a tube holder of the sample preparation instrument of FIG. 2, the output tubes having output tube labels.

FIG. 12 illustrates an example of output tubes **165*a*-165*d* held on the tube holder 164 of the sample preparation instrument 104. As shown in FIG. 12, the output tubes 165*a*-165*d* each have an output tube label 1100 that includes a specimen-panel assignment barcode 1102 and human-readable information 1104 that identifies the processed sample 94 contained each output tube, and also a tube barcode 1110 that identifies each output tube. As further shown in FIG. 12, the tube holder 164 can include machine-readable markers 169 that identify each cell 167 on the tube holder 164. In some examples, the machine-readable markers 169** include one-dimensional barcodes, or two-dimensional codes such as QR codes, Data Matrix codes, and the like.

The tube holder 164 has a plurality of cells 167 for holding the output tubes 165. In some examples, the tube holder 164 has a capacity for holding 32 output tubes, or more. In some instances, fewer than 32 output tubes can be loaded onto the tube holder 164.

Referring back to FIG. 6, in some examples, operations 602 and 610 can be performed together. For example, the user 80 can generate both the specimen machine-readable label 143 and the output tube label 1100 at the same time. In some further examples, operations 610-614 can be performed first (i.e., before operations 602-608). Accordingly, the order of the operations in the method 1000 may vary. Also, in some examples, the method 1000 can include additional steps of generating, printing, and attaching the tube barcode 1110 in cases where the output tube 165 does not already include a barcode that uniquely identifies the output tube.

FIG. 13 schematically illustrates an example of a method 1300 of dispensing the processed samples 94 into preselected output tubes. The method 1300 is performed by the sample preparation instrument 104 in accordance with the barcode assigned mode (i.e., the second mode 128). The output tubes are preselected in that the user 80 has chosen the output tubes to receive the processed samples 94 by attaching the output tube labels 1100 to the tubes. This is different from the auto assigned mode (i.e., first mode 126) in which the output tubes are selected by the sample preparation instrument 104 in the order held on a tube holder 164.

The method 1300 can be performed by the sample preparation instrument 104 after completion of the method 600 by the user 80 such that the specimen tubes 139 are loaded in the input station 136, and the output tubes 165 that include the output tube labels 1100 are loaded on the tube holder 164 in the output station 162 of the sample preparation instrument 104.

The method 1300 includes an operation 1302 of scanning the specimen-panel assignment barcode 1102 on the output tube labels 1100 attached to the output tubes 165. As shown in FIG. 4, the output tubes 165 are held on the tube holder 164, which can rotate about an axis 171. The one or more internal scanners 158, which is stationary, reads the specimen-panel assignment barcode 1102 as the tube holder 164 rotates about the axis 171.

In operation 1302, the one or more internal scanners 158 can also read the tube barcode 1110 and the machine-readable markers 169 that identify the cells 167 on the tube holder 164. The sample preparation instrument 104 can use this information to determine the location of each of the output tubes 165 on the tube holder 164 (i.e., in which cell 167 each output tube is placed).

Next, the method 1300 includes an operation 1304 of associating the output tubes 165 held on the tube holder 164 with tube numbers of a panel selected for the specimen. The panel can be selected according to operations 602-608 in the method 600. The specimen can be identified by the specimen machine-readable label 143 attached to a specimen tube 139.

Next, the method 1300 includes an operation 1306 of displaying information related to the output tubes 165 held on the tube holder 164, as well as the specimen. The information can be displayed on the touch display 156 of the sample preparation instrument 104.

Figure 14:
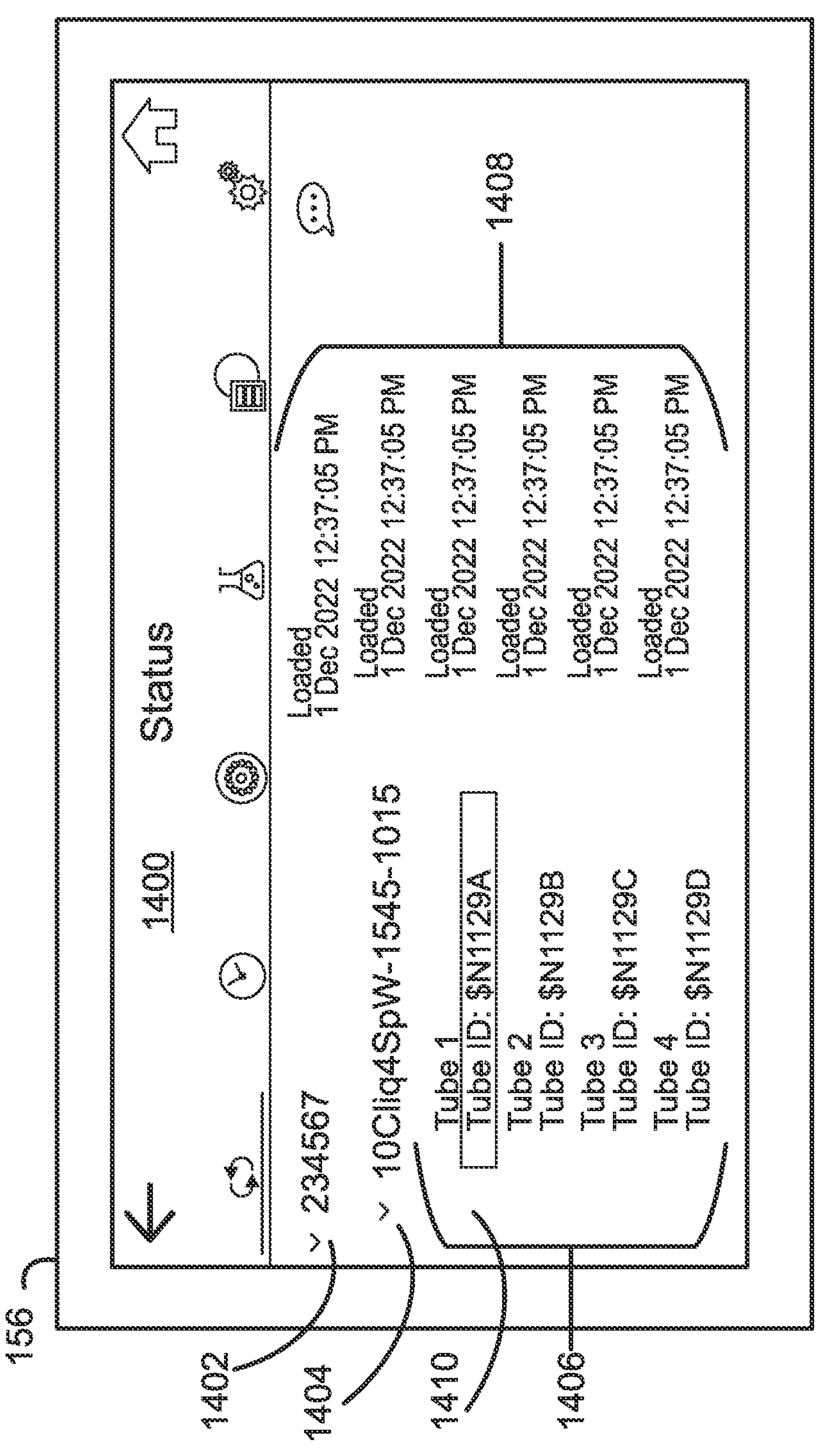
FIG. 14 illustrates an example of a status screen displayed on the touch display of the sample preparation instrument of FIG. 2.

FIG. 14 is an example of a status screen 1400 displayed on the touch display 156 of the sample preparation instrument 104 in accordance with operation 1306. In this illustrative example, the status screen 1400 includes an identifier 1402 that identifies the specimen ID, and a status 1408 such as whether the specimen is loaded or not in the input station 136.

The status screen 1400 includes an identifier 1404 that identifies a panel selected for the specimen, and identifiers 1406 that identify the preselected output tubes that will be used by the sample preparation instrument 104 for completing the panel. The identifiers 1406 can include an output tube ID 1410 detected from the tube barcode 1110 that uniquely identifies each output tube 165. The status screen 1400 can include a status 1408 for each preselected output tube in the panel. The status 1408 can also include a date and time regarding the status of the specimen, and when they are loaded in the input station 136.

Referring back to FIG. 13, the method 1300 can include an operation 1308 of validating the output tube information. Operation 1308 can include determining whether any of the preselected output tubes for the completing the panel are missing from the tube holder 164. When an error is detected (i.e., "No" in operation 1310), the method 1300 can proceed to an operation 1312 of issuing an alert that can be provided on the status screen 1400 displayed on touch display 156, and the method 1300 returns to operation 1306. In such cases, the sample preparation instrument 104 prevents the transfer station 138 from transferring the processed samples 94 to the output tubes 165 when at least one preselected output tube is missing.

When no error is detected (i.e., "Yes" in operation 1310), the method 1300 proceeds to an operation 1314 of transferring the processed samples 94 to the preselected output tubes when the processed sample are complete. Operation 1314 is based on the association of the preselected output tubes with the tube numbers of the panel selected for the specimen (see operation 1304). Instead of dispensing a processed sample 94 into an output tube 165 based on the order of the output tube on the tube holder 164, operation 1314 includes transferring the processed sample 94 to the output tube 165 based on the output tube label 1100 attached to the output tube, which includes a specimen-panel assignment barcode 1102 having data that matches the specimen ID, panel code, tube number of the processed sample 94.

Operation 1314 can include determining the locations of the preselected output tubes on the tube holder 164 for determining where to dispense the processed samples 94. The locations of the preselected output tubes can be determined based on the specimen-panel assignment barcodes 1102 or the tube barcodes 1110, and the machine-readable markers 169 that identify the cells 167 on the tube holder 164 where the preselected output tubes are held.

Operation 1314 can further include using the transfer station 138 to dispense the processed samples 94 into the preselected output tubes. For example, the sample preparation instrument 104 can utilize the transfer station 138 to position a probe 141 that contains a processed sample 94 above a preselected output tube held on the tube holder 164. The sample preparation instrument 104 can also rotate the tube holder 164 about the axis 171 to position the preselected output tube under the probe 141 that contains the processed sample 94. Once the preselected output tube is under the probe 141, the sample preparation instrument 104 causes the probe 141 to dispense the processed sample 94 into the preselected output tube.

As an illustrative example, the sample preparation instrument 104 can rotate the tube holder 164 about the axis 171 to position a first preselected output tube under the probe 141 of the transfer station 138, the first preselected output tube having a specimen-panel assignment barcode 1102 that includes data matching a specimen ID, a panel code, and a tube number of a first processed sample held by the probe 141. After the probe dispenses the first processed sample, the transfer station 138 can move the probe 141 to the probe wash station 154 to wash the probe, move the probe 141 to the plate mixer 150 of the reaction station 148 to aspirate a second processed sample, and then move the probe 141 above the output station 162. Also, two probes can be used to transfer the prepared samples to the output tubes. For example, after dispensing of a first processed sample using a first probe, the transfer station 138 can switch to a second probe to dispense a second processed sample into a second output tube.

Thereafter, the sample preparation instrument 104 can rotate the tube holder 164 about the axis 171 to position a second preselected output tube under the probe 141, the second preselected output tube having a specimen-panel assignment barcode 1102 that includes data matching the specimen ID, the panel code, and the tube number of the second processed sample held by the probe 141. In some examples, one or more output tubes are positioned on the tube holder 164 between the first and second preselected output tubes. Thus, the processed samples 94 are dispensed in the preselected output tubes based on the specimen-panel assignment barcodes 1102, instead of the order that the output tubes are held on the tube holder 164.

In some examples, the method 1300 can further include an operation 1316 of displaying an updated status of a preselected output tube. The updated status of the preselected output tube can be displayed on the touch display 156 of the sample preparation instrument 104.

Figure 15:
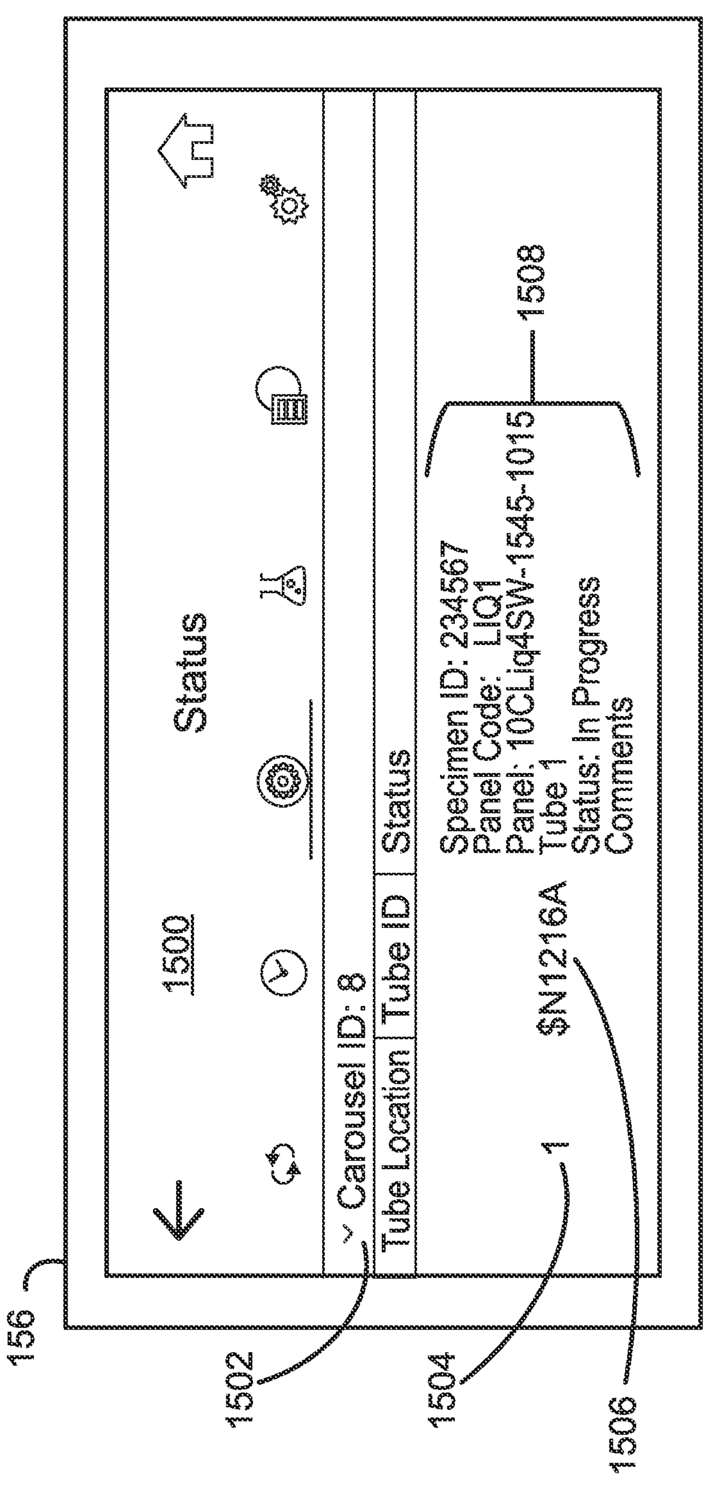
FIG. 15 illustrates another example of the status screen displayed on the touch display of the sample preparation instrument of FIG. 2.

FIG. 15 illustrates another example of a status screen 1500 displayed on the touch display 156 of the sample preparation instrument 104. In this illustrative example, the status screen 1500 is displayed for a preselected output tube. The status screen 1500 can be generated when the user 80 selects one of the identifiers 1406 in the status screen 1400 of FIG. 14.

As shown in FIG. 15, the status screen 1500 can include an identifier 1502 that identifies the tube holder 164 (e.g., "Carousel ID: 8"). The user 80 can load and unload a plurality of different tube holders in the output station 162. The sample preparation instrument 104 allows one tube holder 164 (i.e., carousel) to be loaded at a time.

The status screen 1500 can include an identifier 1504 that identifies a location of the preselected output tube on the tube holder 164 (e.g., "Tube Location 1"). For example, the identifier 1504 can identify which cell on the tube holder 164 holds the preselected output tube. The status screen 1500 can also include an identifier 1506 that identifies the tube ID based on the tube barcode 1110 attached to the preselected output tube.

The status screen 1500 can also include a status block 1508 that identifies the specimen ID, the panel code, the panel name, and the tube number based on the specimen-panel assignment barcode 1102 attached to the preselected output tube. The status block 1508 can also include a status such as whether the processed sample 94 has been dispensed into the preselected output tube. In the example shown in FIG. 15, the updated status is indicated as "In Progress".

FIG. 16 schematically illustrates an alternative example of a method 1600 that can be performed by the user 80 of the sample preparation instrument 104 under a barcode assigned mode. The method 1600 includes an operation 1602 of generating and attaching a specimen machine-readable label 143 to a specimen tube 139, an operation 1604 of scanning the specimen machine-readable label 143, an operation 1606 of selecting one or more panels to be prepared by the sample preparation instrument 104, and an operation 1608 of placing the specimen tube 139 (with the specimen machine-readable label 143 attached thereto) into the input station 136. Operations 1602-1608 are substantially similar as operations 602-608 of the method 600.

The method 1600 includes an operation 1610 of placing human-readable information on preselected output tubes. The human-readable information can include a specimen name/ID, panel name, tube number, and other information that can be read by a user. In some examples, the human-readable information is printed on a label that attaches to the preselected output tube. Alternatively, the human-readable information can be handwritten on the preselected output tube. Additional means for placing the human-readable information are possible.

Next, the method 1600 includes an operation 1612 of opening a user interface screen on the touch display 156. The user interface screen includes output tube ID fields for each output tube needed for completion of the one or more panels selected in operation 1606.

The method 1600 includes an operation 1614 of scanning the tube barcodes 1110 of the preselected output tubes having the human-readable information to enter the random alphanumeric code of each preselected output tube into an appropriate output tube ID field of the user interface screen. Operation 1614 can include using the external scanner 160 to scan the tube barcodes 1110. In this manner, the random alphanumeric code of each preselected output tube is associated with a designated tube number of the one or more panels selected in operation 1606.

Alternatively, instead of using the sample preparation instrument 104 to assign the preselected output tubes to the one or more panels selected for the specimen, the user 80 can assign the preselected output tubes remotely, such as by using a remote workstation such as the panel design system 102, or another type of remote workstation. As an illustrative example, the assignment of the preselected output tubes can be saved in a file that can be transmitted to the sample preparation instrument 104 over a network (e.g., the Internet) such that the sample preparation software 124 can use the file for transferring the processed samples 94 when completed to appropriate output tubes that have been preselected by the user 80.

Next, the method 1600 includes an operation 1616 of placing the preselected output tubes into the tube holder 164, and inserting the tube holder 164 into the sample preparation instrument 104. Operation 1616 is substantially similar to operation 614 of the method 600. After operation 1616 is completed, the sample preparation instrument 104 can perform the method 1300 of dispensing the processed samples 94 into the preselected output tubes.

The various embodiments described above are provided by way of illustration only and should not be construed to be limiting in any way. Various modifications can be made to the embodiments described above without departing from the true spirit and scope of the disclosure.

What is claimed is:

1. A sample preparation instrument for dispensing processed samples into output tubes, the sample preparation instrument comprising:

an input station for receiving one or more specimen tubes;

an output station for receiving a tube holder holding the output tubes, each output tube having an output tube label including a specimen-panel assignment barcode and human-readable information;

a transfer station operating to move a probe to dispense the processed samples into the output tubes; and a sample preparation computer including one or more processing devices, and a system memory storing software instructions that, when executed by the one or more processing devices, cause the one or more processing devices to:

scan the specimen-panel assignment barcodes;

associate the output tubes with a panel selected for the one or more specimen tubes; and operate the transfer station to dispense the processed samples into the output tubes based on the association of the output tubes with the panel.

2. The sample preparation instrument of claim 1, wherein the software instructions, when executed by the one or more processing devices, further cause the one or more processing devices to:

determine locations of the output tubes on the tube holder by:

reading machine-readable markers each identifying a cell on the tube holder; and associating the specimen-panel assignment barcodes with the cells.

3. The sample preparation instrument of claim 1, wherein the software instructions, when executed by the one or more processing devices, further cause the one or more processing devices to:

rotate the tube holder about an axis allowing an internal scanner to read the specimen-panel assignment barcodes on the output tubes.

4. The sample preparation instrument of claim 1, wherein the specimen-panel assignment barcode encodes data including a specimen ID, a panel code, and a tube number.

5. The sample preparation instrument of claim 4, wherein the software instructions, when executed by the one or more processing devices, further cause the one or more processing devices to:

rotate the tube holder about an axis to position a first output tube under the probe, the first output tube having a first specimen-panel assignment barcode encoding a first combination of the specimen ID, the panel code, and the tube number; and dispense a first processed sample into the first output tube based on the first combination of the specimen ID, the panel code, and the tube number.

6. The sample preparation instrument of claim 5, wherein the software instructions, when executed by the one or more processing devices, further cause the one or more processing devices to:

rotate the tube holder about the axis to position a second output tube under the probe, the second output tube having a second specimen-panel assignment barcode encoding a second combination of the specimen ID, the panel code, and the tube number; and dispense a second processed sample into the second output tube based on the second combination of the specimen ID, the panel code, and the tube number.

7. The sample preparation instrument of claim 1, wherein the software instructions, when executed by the one or more processing devices, further cause the one or more processing devices to:

scan tube barcodes attached to each of the output tubes, each tube barcode having a random alphanumeric code; and associate the random alphanumeric codes with data encoded on the specimen-panel assignment barcodes.

8. The sample preparation instrument of claim 1, wherein the software instructions, when executed by the one or more processing devices, further cause the one or more processing devices to:

prevent the transfer station from dispensing the processed samples when at least one output tube for completing the panel is missing from the tube holder.

9. The sample preparation instrument of claim 1, wherein the software instructions, when executed by the one or more processing devices, further cause the one or more processing devices to:

display a status of the output tubes.

10. The sample preparation instrument of claim 1, wherein the processed samples are prepared by mixing one or more reagents with unprocessed samples of the one or more specimen tubes.

11. A method of dispensing processed samples from a specimen into output tubes, the method comprising:

scanning specimen-panel assignment barcodes attached to the output tubes, each of the specimen-panel assignment barcodes encoding data including at least a specimen ID, a panel code, and a tube number;

associating the output tubes with a panel selected for the specimen based on the data encoded on the specimen-panel assignment barcodes; and dispensing the processed samples into the output tubes based on the association of the output tubes with the panel.

12. The method of claim 11, further comprising:

determining locations of the output tubes on a tube holder by:

reading machine-readable markers each identifying a cell on the tube holder; and associating the specimen-panel assignment barcodes with the cells.

13. The method of claim 12, further comprising:

rotating the tube holder about an axis allowing an internal scanner to read the specimen-panel assignment barcodes on the output tubes.

14. The method of claim 13, further comprising:

rotating the tube holder about the axis to position a first output tube under a probe, the first output tube having a first specimen-panel assignment barcode encoding a first combination of the specimen ID, the panel code, and the tube number; and dispensing a first processed sample into the first output tube based on the first combination of the specimen ID, the panel code, and the tube number.

15. The method of claim 14, further comprising:

rotating the tube holder about the axis to position a second output tube under the probe, the second output tube having a second specimen-panel assignment barcode encoding a second combination of the specimen ID, the panel code, and the tube number; and dispensing a second processed sample into the second output tube based on the second combination of the specimen ID, the panel code, and the tube number.

16. The method of claim 15, wherein the tube holder includes one or more output tubes positioned between the first and second output tubes.

17. The method of claim 12, further comprising:

preventing the dispense of the processed samples when at least one output tube for completing the panel is missing from the tube holder; and issuing an alert when the at least one output tube for completing the panel is missing from the tube holder.

18. The method of claim 11, further comprising:

scanning tube barcodes attached to each of the output tubes, each tube barcode having a random alphanumeric code; and associating the random alphanumeric codes with the data encoded on the specimen-panel assignment barcodes.

19. The method of claim 11, further comprising:

displaying a status of the output tubes.

20. A sample preparation instrument for dispensing processed samples into output tubes, the sample preparation instrument comprising:

a sample preparation computer including one or more processing devices, and a system memory storing software instructions that, when executed by the one or more processing devices, cause the one or more processing devices to:

scan specimen-panel assignment barcodes attached to the output tubes, each specimen-panel assignment barcode encoding data including at least a specimen ID, a panel code, and a tube number;

associate the output tubes with a panel selected for a specimen based on the data encoded on the specimen-panel assignment barcodes; and dispense the processed samples into the output tubes based on the association of the output tubes with the panel.

* * * * *